Nov. 21, 1939.   I. E. McELROY ET AL   2,180,687
VARIABLE SPEED PULLEY
Filed June 9, 1933   5 Sheets-Sheet 1
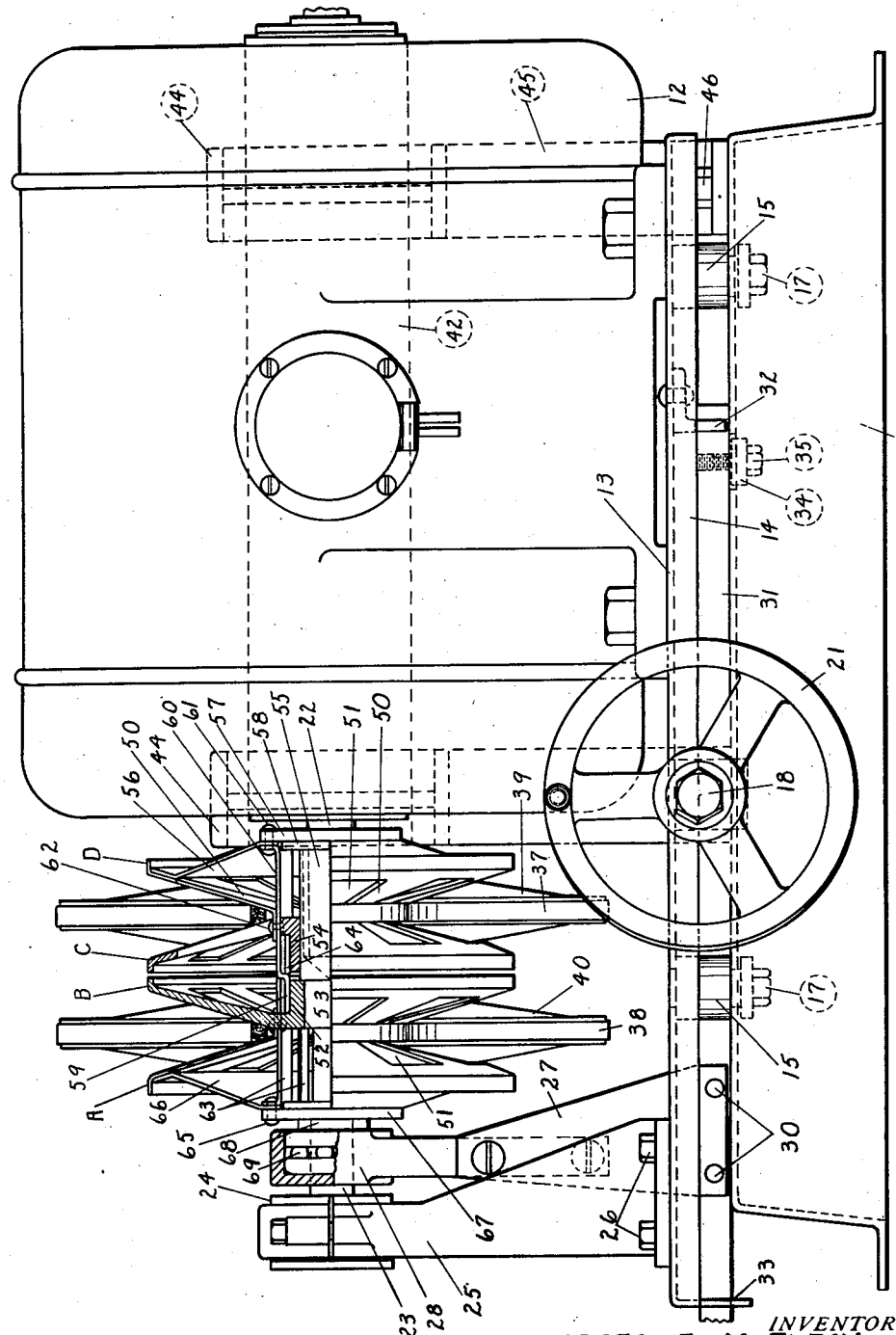
Fig.1
INVENTORS
ISAAC E. McELROY
RICHARD H. SHADRICK
BY
ATTORNEY

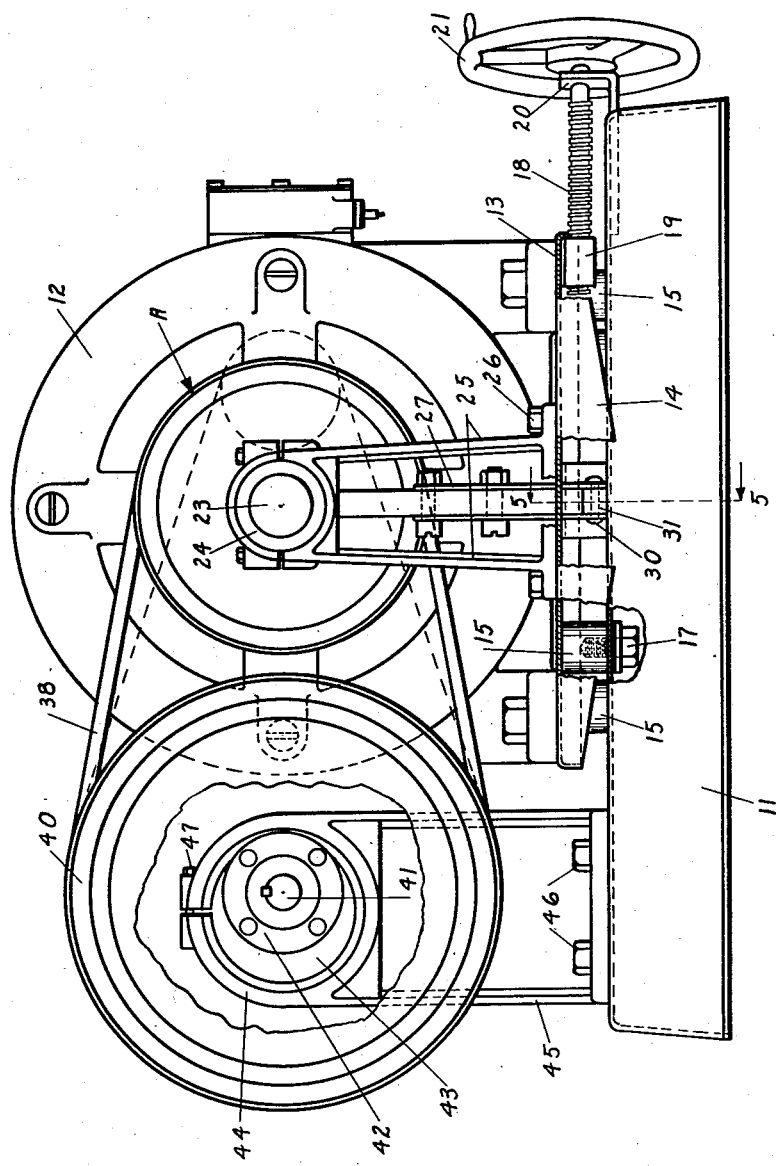

Nov. 21, 1939.  I. E. McELROY ET AL  2,180,687
VARIABLE SPEED PULLEY
Filed June 9, 1933   5 Sheets-Sheet 3

INVENTORS
ISAAC E. McELROY
RICHARD H. SHADRICK
BY
ATTORNEY

Nov. 21, 1939. I. E. McELROY ET AL 2,180,687
VARIABLE SPEED PULLEY
Filed June 9, 1933 5 Sheets-Sheet 4

INVENTORS
ISAAC E. McELROY
RICHARD H. SHADRICK
BY Andrew E. Carlsen
ATTORNEY

Nov. 21, 1939. I. E. McELROY ET AL 2,180,687
VARIABLE SPEED PULLEY
Filed June 9, 1933   5 Sheets-Sheet 5

INVENTORS.
ISAAC E. McELROY
RICHARD H. SHADRICK
BY
ATTORNEYS.

Patented Nov. 21, 1939

2,180,687

UNITED STATES PATENT OFFICE 2,180,687

VARIABLE SPEED PULLEY

Isaac E. McElroy and Richard H. Shadrick, Minneapolis, Minn., assignors, by mesne assignments, to U. S. Electrical Motors, Inc., Los Angeles, Calif., a corporation of California Application June 9, 1933, Serial No. 675,140

29 Claims. (Cl. 74—230.17)

The invention relates to power transmission mechanisms and the primary object is to provide a highly efficient, practical, and comparatively simple and economical construction of variable speed transmitting device, and particularly in the class of such devices wherein the relative rates of speed between driving and driven members may be changed while the mechanism is in motion. In a more specific sense the invention may be said to embody two fundamental and distinct, yet correlated conceptions, the first of which is embodied in a pulley structure unit proper, while the second includes a pulley the effective diameter of which is increased or decreased, by certain mechanism, in direct and synchronous relationship to certain movements of the pulley as a unit, such movements having for their purpose to maintain a uniform tautness and proper alignment of the belt (or other element) operating over the pulley regardless of what effective diameter adjustments may be made in the pulley proper. A further or more specific object is to provide a pair of belt connected pulleys operating on spaced parallel axes, with means for simultaneously and positively increasing or decreasing the effective belt diameter of one of the pulleys and therewith decreasing or increasing the distance between the pulley centers, to maintain a uniform belt contact or action; while also providing secondary and independently adjustable means for regulating the spacing between the pulleys to thereby provide convenient means for loosening or tightening up the belt and belt surface contacts. These and still other more detailed and specific objects will be disclosed in the course of the following specification, reference being had to the accompanying drawings, wherein—

Fig. 1 is a front elevation of a structure embodying our invention, with certain parts in section for purpose of illustration.

Fig. 2 is a side elevation of the device with various parts broken away for purpose of illustration.

Figures 3, 4:
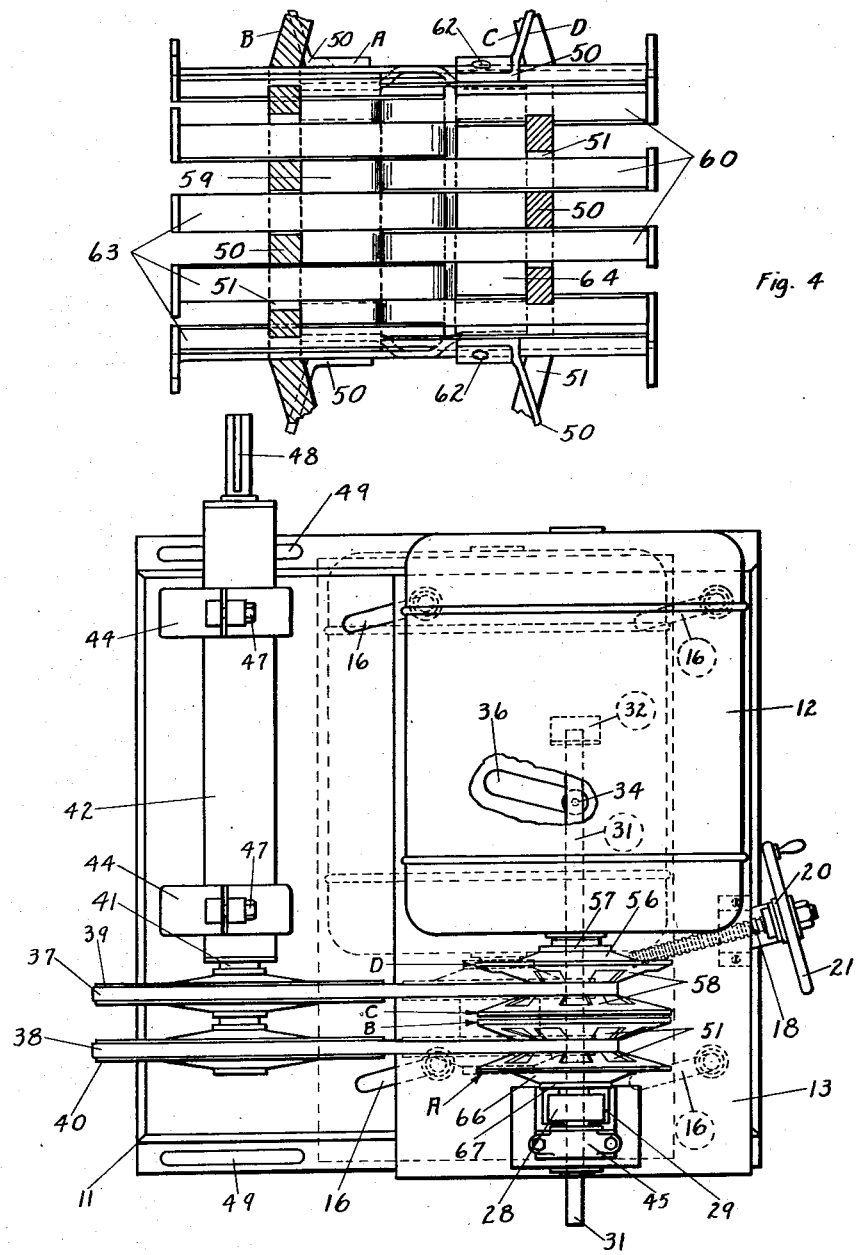
Fig. 3 is a plan view of the mechanism as shown in Figs. 1 and 2 but on a reduced scale.
Fig. 4 is an enlarged detail view, partly in section, of a telescopic unit employed in the pulley structure proper.

Referring to the drawings more particularly and by reference characters, 11 designates a base which forms a primary support for the entire mechanism, including the motor 12, and is preferably disposed and secured in the vicinity of the press, blower, or other machine to which driving power is to be transmitted from this motor. Disposed over a substantial portion of the base 11 is a plate or platform 13 having depending reinforcing flanges 14 at its edges. The platform 13 is spaced from and slidably supported on the base 11 by round shoes or lugs 15 that are rigid with the plate but movably rest on the base adjacent to a series of spaced slots 16 up through which stud bolts 17 extend and screw into the shoes 15. The stud bolts primarily serve as guides to control the direction of movement of the plate 13 on the base, and as the four slots 16 are all parallel with respect to each other but at an acute angle with respect to the side edges of the base it will be seen that the plate 13 together with the motor 12 and pulley it supports has freedom for certain predetermined diagonal or oblique movement, while also always retaining its edge parallelism with the base.

The platform is moved, lengthwise of the slots 16, and is secured in selectively adjusted positions by a threaded bar or worm 18, disposed parallel with respect to the slots 16, and threaded at its inner end in a lug 19 fixed to and depending from the plate 13. The outer end of the bar 18 is journaled in a bearing extension 20 of the base 11 and is provided with a hand wheel 21, which, when turned, will rotate the bar 18 to thus effect the aforesaid movements to the platform over and with respect to the base 11.

The motor 12 is rigidly mounted upon one end portion of the plate 13 and has a shaft 22 that projects into and is keyed to a partially tubular stub shaft 23 that is journaled as at 24 in a bearing standard 25 rigidly mounted as at 26 upon the opposite or other end of the platform 13.

Figure 5:
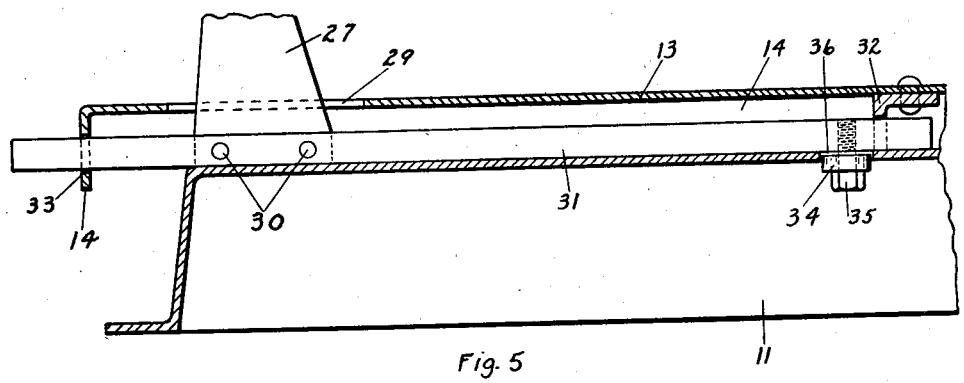
Fig. 5 is an enlarged detail sectional elevation through a portion of the base structure, as on the line 5—5 in Fig. 2.

Disposed between the pulley unit proper and the standard 25 is a second standard or post 27 having an integral bearing collar 28 at its upper end, while its lower end extends through a slot 29 (see Fig. 5) in the plate 13 and is secured as at 30 to a square shaft 31 resting on the base 11. The shaft 31 is longitudinally slidable in end guides consisting of a bifurcated lug 32 projecting down from the plate 13 to engage one end of the shaft, and a square hole 33 in the flange 14 to slidably receive the other or outer end of the shaft. At a point intermediate the guides 32 and 33 the shaft 31 is provided with a lug or roller 34 secured by a short bolt 35, and this member 34 guides in a slot 36 in the base 11. It may now be noted that the slot 36 is disposed at the same angle with respect to the vertical planes of the pulley belts 37 and 38 as are the slots 16, but that it extends in the opposite oblique direction, and consequently when the hand wheel 21 is turned to move the platform, for instance inwardly over the base, the platform will move to the left, as shown in Fig. 1, by reason of the slots 16, and in synchronism with this movement and to the same extent and degree the bearing post 27 will move to the right by reason of the roller 34 moving in the slot 36 to thereby actuate the square shaft 31 in its guides 32 and 33.

Thus, turning the hand wheel 21 produces three actions or functions, the purposes of which may be noted as follows: First, a relative movement as between the motor 12 and bearing post 27. This movement is utilized, as will presently be described, to close and spread interlacing conical pulley sections to thereby enlarge and reduce the effective diameter of the belt engaging grooves, and to thereby regulate the speed of the driven belts. Second, the movement of the adjustable pulleys to and away from relatively constant driven pulleys 39 and 40, the purpose of which is to take up slack in the belts as the adjustable pulleys are reduced in belt size and to reduce the center distance when the pulleys are effectively enlarged. It will be understood that these two movements are synchronized and coordinated so that the belts will always maintain a substantially uniform tautness. Third, the lateral movements of the motor and bearing post, the object of which is to move the interlacing pulley section of each unit equal distances to and from a fixed median line between them to thereby maintain proper belt alignments between the adjustable pulley units and their respective driven pulleys 39 and 40. This movement is also of course coordinated with the first two mentioned movements so as to produce the proper and most efficient result.

As it is necessary to provide means, independent of the movements just above described, for accommodating the mechanism to slightly varying lengths of belts, such as due to stretching replacements, etc., we mount the pulleys 39 and 40 upon a shaft 41 that extends through and is journaled in a bearing sleeve 42, having integral eccentric hubs or collars 43 that are releasably and rotatably secured in ring clamp portions 44 of a pair of standards 45 rigidly secured to the base 11 as at 46. By releasing the clamp bolts 47 the sleeve 42 may be manually turned to bring the cams 43 into action thus shifting the center of shaft 41 with respect to the axis of the motor shaft, after which the bolts are retightened so as to render the eccentrics 43 non-rotatable.

The power take-off pulley (not shown) is keyed, as at 48, to the outer end of the shaft 41, and consequently when the last described adjustment is made the position of the shaft 41 with reference to the driven machine or unit will be changed, and to offset or compensate for this change in pulley centers we preferably provide the base 11 with flange slots 49 so that anchoring bolts for the base can be released to permit adjustments of the entire base to and away from the driven machine.

Attention is now directed to the main or preferred form of the variable pulley structure proper, as shown particularly in Figs. 1, 3, and 4, wherein is illustrated a multiple unit pulley for accommodating two belts. Certain novel structural features are to be found in this particular design, but it is not to be inferred thereby that the device is necessarily confined to a two belt arrangement, because by slight modification it is obviously possible to adapt the pulley design to a one belt structure or to a multiple arrangement of three or more belts, all depending upon the size of motor and the amount of speed or power to be transmitted.

The double unit pulley structure here illustrated includes four conical disks A, B, C, and D, arranged in pairs and with the disks of each pair provided with tapered radial spokes 50 and slots 51 which interlace or telescope with each other so that the diameter of the V-shaped belt groove defined by the intersecting discs can be enlarged or reduced by closing or spreading the discs with respect to each other.

The disks B and C are preferably made of cast metal such as aluminum, and the first of these has a hub 52 that is fixed by either a key or by driving fit upon an intermediate reduced portion 53 of the stub shaft 23. The disk C has a hub 54 slidable on the relatively larger inner end portion 55 of the shaft 23. The disk D is preferably made of sheet metal and is reinforced by a reversely coned back plate 56 that is riveted to a collar or large washer 57 that is in turn rigidly secured to an integral flange 58 at the inner end of the shaft 23. Thus the disks B and D are both secured on and rotate with the shafts 22 and 23. These disks are further united, however, by a tube or collar 59 that is firmly fitted (and if necessary welded or screwed) upon the disk hub 52, and has a series of outwardly offset, longitudinally extending fingers 60 that are bent outwardly at their ends to receive the rivets 61 that fasten the back plate 56 and ring 57 together. The inner ends of the spokes 50 of the disk D are also riveted or spot welded to intermediate portions of the fingers 60, as at 62. It may here be noted that while the tube 59 is tightly fitted upon the hub 52 it is also important that its edge, opposite the fingers 60, be in close contact with disk (B) spokes, so as to insure a true centered or guided rotation of the disk when in action.

Interlaced with the circumferentially spaced fingers 60 of the tube 59 is a series of similar but oppositely directed fingers 63 all integral with a tube or sleeve 64 fixed on the hub 54 of the disk C. The outer ends of these fingers are secured by rivets 65 which also secure a back plate 66, of disk A, to a collar 67 of a hub 68 which extends into a thrust bearing 69 within the bearing collar 28. The hub 68 of course also rotates with the shaft 23 but is free to move longitudinally thereof together with the disks A and C, when the bearing post 27 is moved with respect to the motor as previously set forth. It will thus be seen that the relative movements thus produced by manipulation of the hand wheel 21, will immediately, correspondingly, and accurately adjust the disks A and C with respect to the disks B and D, respectively, and this adjustment will in turn produce the desired changes in pulley diameters.

Figure 6:
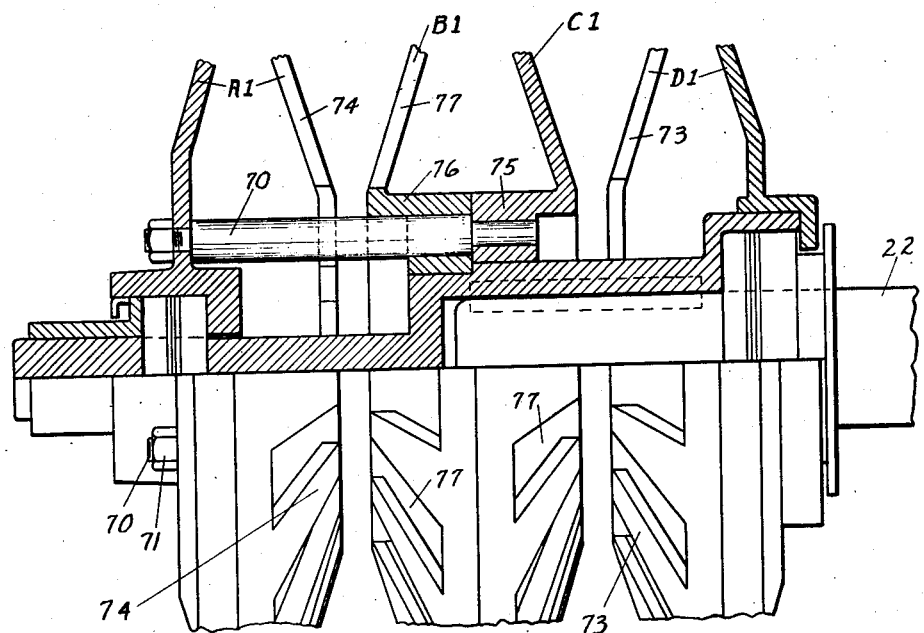
Fig. 6 is an enlarged detail view, partly in section, showing a modified form of pulley unit.

In Fig. 6 is illustrated a modification of the pulley design, wherein the devices 59, 60, 63, and 64 are substituted by an annular series of circumferentially spaced tie bolts 70, the inner ends of which are tightly fitted in the disk C1, and the outer ends are secured as by nuts 71 to the disk A1, while the intermediate portions are free to slidably engage the disk B1. The disks B1 and D1 are fixed with respect to the partly tubular shaft 72 which corresponds to the shaft 23 in the preferred form. In this instance it may be noted that the inner ends of the spokes 73 and 74 are free and unattached so as to permit them to pass in through the radial slots 77 and over the hubs 75 and 76, respectively, of the disks C1 and B1.

Figure 7:
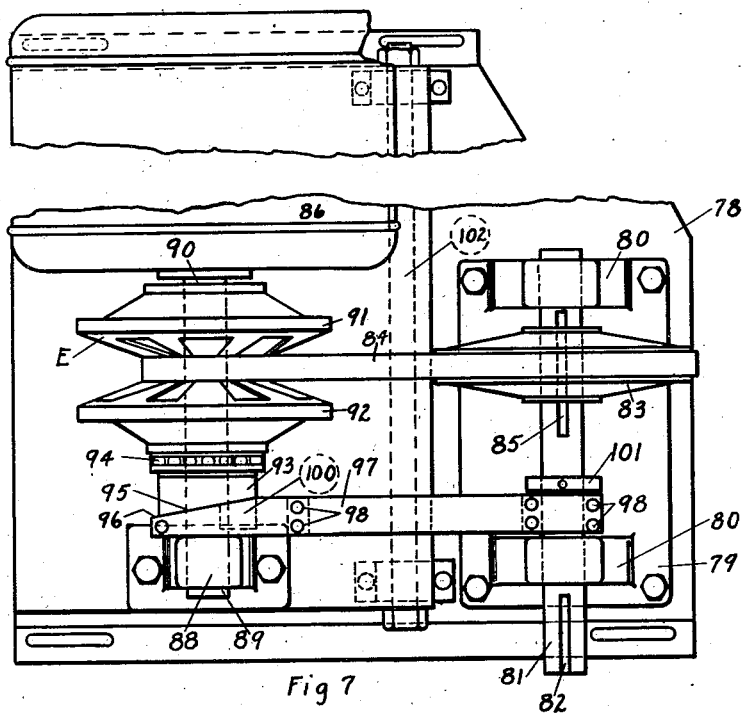
Fig. 7 is a plan view of a modified form of the mechanism.
Figure 8:
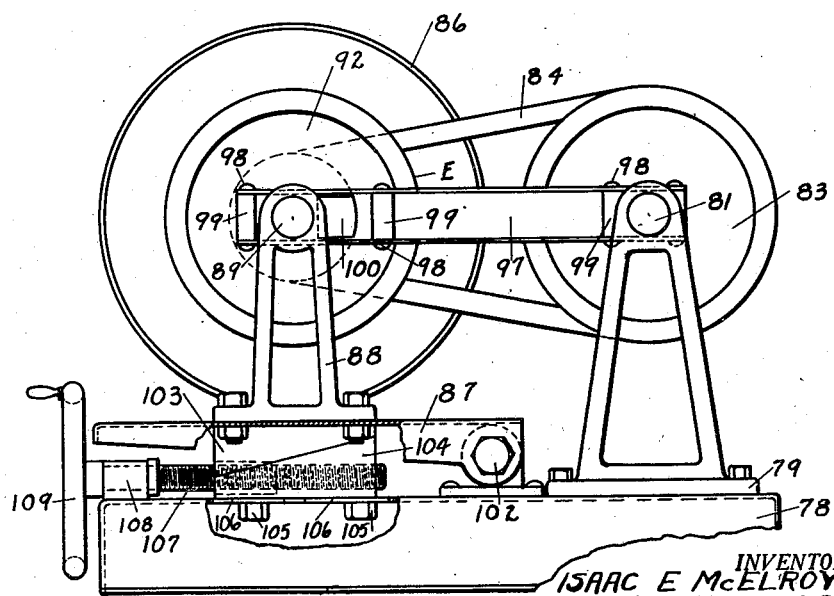
Fig. 8 is an end elevation of the device as seen from below in Fig. 7, but with a fractional portion broken away for purpose of illustration.

In the modified form of the structure as shown in Figs. 7 and 8, the base 78 supports at one end a fixed plate 79 having a pair of outboard bearing standards 80 in the upper ends of which is journaled a shaft 81. The outer end of this shaft is provided with a keyway 82 whereby a pulley or gear may be mounted upon it and connected to the machine to be driven. The shaft 81 carries a driven pulley 83 which is freely slidable on the shaft so as to be self-aligning with respect to the variable pulley, designated generally by the letter E, under the centering action of the connecting belt 84. The pulley 83 is splined to the shaft 81, however, as by a key 85 so that the shaft will rotate with the pulley.

The motor 86 is mounted upon a platform 87, as is also a bearing standard 88. In the upper end of this standard is journaled a shaft 89 which extends into the pulley E, and is joined with and driven by the motor shaft 90 in substantially the same manner as previously set forth in connection with the shafts 22 and 23. In this structure only one variable pulley E is employed, and is constructed and operated in substantially the same way as the previously described pulley units. In this case, however, the pulley embodies two sections 91 and 92, the first of which is axially fixed with respect to the motor 86, but the second of which is axially movable on the shaft 89 so that when it is moved to and away from the section 91 it will correspondingly enlarge or reduce the effective belt diameter.

The movement of the pulley section 92 is controlled by a collar 93 which has roller bearing engagement with the pulley section 92 as at 94. The other end of the collar 93 is provided with an angular face 95 for sliding surface contact with an angularly disposed edge portion 96 of a bar 97. This bar 97 is made up of parallel members secured together in spaced relationship by rivets 98 and spacer blocks 99. The collar 93 is provided with a lug 100 which extends into the bar 97 between two of the spacer blocks 99, and has freedom for sliding action in the bar while serving to prevent rotation of the collar 93 with the shaft 89. The opposite end of the bar 97 is trunnioned upon the shaft 81 and is properly maintained adjacent one of the standards 80 by a small collar 101 fixed on the shaft 81.

The platform 87 is tiltably secured to the base 78 by a shaft 102 having suitable bearing connections with the members 78 and 87. The under side of the platform 87 is provided with a fixed, wedge shaped support member 103 which rests upon and has sliding contact with a reversely tapered wedge member 104. This member 104 is slidably secured to the base 78 by stud bolts 105 operating in slots 106 in the base. The wedge member 104 is adjustably actuated by a shaft 107 that is threaded into the member, and this shaft 107 is rotatably fixed in a bearing 108 on the base and has a hand wheel 109 at its outer end by which the shaft may be rotated to thus move the wedge member 104 in and out as may be desired. As this movement takes place it will be seen that the platform 87, together with the members E, 86, 88, 89, 93, etc., will be raised or lowered to thus move the variable pulley E with respect to the driven pulley 83. However, when such movement takes place the distance between the shaft centers 102 and 89 will remain constant, while the distance between the shaft centers 89 and 81 will be changed. This change in shaft centers is permitted by reason of the sliding action of the bar 97 on the shaft 89, and it is this relative movement between the members 97 and 89 that causes the angular contacting surfaces 95 and 96 to move with respect to each other so as to thereby correspondingly move the collar 93 on the shaft 89, and this movement in turn enlarges or reduces the effective belt diameter of the pulley E, and this movement is synchronized with the relative movement between the pulleys in such a manner that regardless of what adjustment is made the belt 84 will always maintain a uniform tautness. Thus it will be seen that the secondary support or platform 87 may be tilted or oscillated to produce substantially the same result as the sliding or horizontally reciprocating movement to the secondary support, as employed in the structure first described.

While we have now shown and described certain preferred embodiments of our invention, it is to be understood that various other modifications may be made without departing from the spirit and scope of the invention as hereinafter claimed. Having now therefore fully shown and described our invention, what we claim is:

1. A power transmitting mechanism comprising a primary support, a pulley mounted on said support, a secondary support mounted for adjustment with respect to the primary support, a motor and pulley mounted on the secondary support, said pulley having two interlacing sections adapted upon being adjusted with respect to each other to vary the effective belt groove diameter defined by the sections, one of said sections being stationary with respect to the motor shaft, means independent of belt action for positively adjusting the other section longitudinally with respect to the motor shaft, and means coordinated with said section adjusting means to adjust the secondary support obliquely with respect to the primary support to thereby maintain belt alignment between the two pulleys when said sectional pulley is being effectively reduced or increased in size.

2. In a variable speed device, the combination of: a drive shaft; a driven shaft; a pair of pulleys, one of said pulleys being associated with said drive shaft and the other of said pulleys being associated with said driven shaft, one of said pulleys being of the variable-diameter type having a pair of flange members, one of said flange members being axially movable relative to the other of said flange members; belt means operatively connecting said pulleys; means for positively adjusting the effective diameter of said variable-diameter pulley; and means for moving one of said pulleys axially as the effective diameter of said variable-diameter pulley is adjusted, so as to maintain said belt means in alignment.

3. In an adjustable speed drive, an electric motor having a shaft, an adjustable pulley structure in axial driving relation to said shaft, said adjustable pulley structure having a pair of pulley sections with opposed inclined belt engaging faces, forming by relative axial adjustment variable effective pulley diameters, means for securing one of said pulley sections in adjusted axial position with respect to said motor shaft, a hub provided for the other of said pulley sections, a bearing structure axially fixed to said hub, means for supporting said bearing structure and for permitting axial movement thereof, a driven shaft, a pulley structure in axial driving relation to said driven shaft, a belt in active driving relation to said pulley structure, an adjustable base having means for supporting said electric motor, positive means for adjusting the position of said adjustable base to adjust the center distance between the axes of said pulley structures, and interlocking means for adjusting the axial position of said bearing structure and the pulley section associated therewith in response to the adjustment of said center distance.

4. In an adjustable speed drive, a pair of rotatably supported shafts, a pair of pulley structures in respective axial driving relation to each of said shafts, a belt in active power transmitting relation to said pulley structures, one of said pulley structures having an adjustable effective diameter, said adjustable pulley structure having a pulley section axially fixed to its respective shaft and a pulley section axially adjustable with respect to said shaft, said pulley sections having opposed inclined belt engaging faces, forming by relative axial adjustment variable effective diameters, a supporting structure provided for said adjustable pulley structure, means for adjusting the position of said supporting structure to adjust the center distance between the axes of said shafts, guide means engaging said supporting structure for adjusting the axial position of the shaft of said adjustable pulley structure in response to the adjustment of said center distance, and interlocking means for adjusting the axial position of said axially adjustable pulley section in response to the adjustment of said center distance.

5. In an adjustable speed drive, an electric motor having a frame and a shaft, an adjustable pulley structure in axial driving relation to said shaft, said adjustable pulley structure having a pair of pulley sections with opposed inclined belt engaging faces, forming by relative axial adjustment variable effective pulley diameters, a rotatably supported driven shaft, a pulley structure in axial driving relation to said driven shaft, a belt in active driving relation to said pulley structures, positive means for adjusting the center distance between the axes of said pulley structures, and means for adjusting the effective diameter of said adjustable pulley structure, said means for adjusting the effective diameter of said adjustable pulley structure including; a hub provided for one of said pulley sections, a bearing axially secured to said hub, an axially adjustable member secured to said bearing, means for preventing rotation of said axially adjustable member and for permitting axial movement thereof, and means for adjusting the axial position of said axially adjustable member.

6. In an adjustable speed drive, a driving pulley structure, a driven pulley structure, a belt for transmitting power between said pulley structures, one of said pulley structures having an adjustable effective diameter and including a pair of pulley sections with opposed inclined belt engaging faces, forming by relative axial adjustment variable effective pulley diameters, a shaft in axial driving relation to said adjustable pulley structure, means for securing one of said pulley sections in fixed axial position to said shaft, positive means for adjusting the axial position of the other of said pulley sections, positive means for adjusting the center distance between the axes of said pulley structures, and means for moving one of said pulley structures in an axial direction to maintain said belt in substantial alignment, as the effective diameter of said adjustable pulley structure is varied.

7. In a multiple belt adjustable speed drive, a pair of rotatably supported shafts, a pair of multiple belt pulleys in respective axial driving relation to each of said shafts, a plurality of belts in active power transmitting relation to said multiple belt pulleys, one of said multiple belt pulleys having an adjustable effective diameter and including a plurality of coaxial adjustable diameter pulley structures, each of said adjustable pulley structures having a pulley section axially fixed with respect to its shaft and a pulley section axially adjustable with respect to its shaft, said pulley sections having opposed inclined faces, forming by relative axial adjustment variable effective pulley diameters, a supporting structure for one of said multiple belt pulleys, means for adjusting the position of said supporting structure to adjust the center distance between the axes of said shafts, means for adjusting the axial position of the supported pulley to maintain the belts in substantial alignment, and means for positively adjusting the axial position of the axially adjustable pulley section of each of said adjustable pulley structures in accordance with the adjustment of said center distance.

8. In a multiple belt adjustable speed drive a pair of shafts, a pair of multiple belt pulleys in respective axial driving relation to each of said shafts, one of said multiple belt pulleys having an adjustable diameter and including a plurality of coaxial adjustable diameter pulley structures, each of said adjustable pulley structures having a pair of pulley sections with opposed inclined faces, forming by relative axial adjustment variable effective pulley diameters, means for adjusting the center distance between the axes of said shafts, and means for simultaneously adjusting the effective diameter of all of said adjustable pulley structures; said means for adjusting the effective diameter of said pulley structures including a bearing, means for fixing the axial position of one pulley section of each of said adjustable pulley structures with respect to said bearing, and means for adjusting the axial position of said bearing.

9. In a multiple belt adjustable speed drive, a driving shaft, a driven shaft, a pair of multiple belt pulleys in respective axial driving relation to each of said shafts, a plurality of belts for transmitting power between said multiple belt pulleys, one of said multiple belt pulleys having an adjustable effective diameter and including a plurality of coaxial adjustable diameter pulley structures, each of said adjustable pulley structures having a pair of pulley sections with opposed inclined belt engaging faces in driving relation to one of said belts and forming by relative axial adjustment variable effective pulley diameters, means for adjusting the center distance between the axes of said shafts, means for adjusting one pulley section of each of said adjustable pulley structures in the same axial direction with respect to the supporting shaft, and means for adjusting the axial position of the shaft of said multiple belt adjustable diameter pulley in the opposite axial direction.

10. A variable-speed transmission of the character described, including: a belt; a motor, a shaft member; a pair of pulleys over which said belt runs, one of said pulleys being mounted on said motor and the other on said shaft member, one of said pulleys being of adjustable V-type having a fixed flange and an axially movable flange; adjusting means for positively and directly moving said movable flange relative to said fixed flange as desired so as to vary the effective diameter of said adjustable pulley; and means operative in consequence of said adjusting means to shift said motor to keep said pulleys in operative alignment through all positions of adjustment of said adjustable pulley.

11. In an adjustable ratio transmission, a pair of shafts having parallel axes, a driving pulley structure on one shaft, a driven pulley structure on the other shaft, one of said pulley structures having a pair of relatively axially adjustable pulley sections with opposed inclined faces, forming by relative axial adjustment, variable effective pulley diameters, an edge-active belt connecting the pulley structures, and means causing the center distance between the shafts to be adjusted, as well as the effective diameter of the variable diameter pulley structure, comprising a movable base upon which one of the shafts is mounted, a stationary support for the base, and a slot and pin connection between the support and the base, the slot being oblique to the axis of the shafts.

12. In an adjustable ratio transmission, a pair of shafts having parallel axes, a driving pulley structure on one shaft, a driven pulley structure on the other shaft, one of said pulley structures having a pair of relatively axially adjustable pulley sections with opposed inclined faces, forming by relative axial adjustment, variable effective pulley diameters, an edge-active belt connecting the pulley structures, and means for causing the center distance between the shafts to be adjusted, as well as the effective diameter of the variable diameter pulley structure, comprising a movable base upon which one of the shafts is mounted, a stationary support for the base, a slot and pin connection between the support and the base, the slot being oblique to the axis of the shafts, a thrust bearing structure cooperating with one of the pulley sections, and movable axially of the pulley structure, and means whereby movement of the base causes movement of the bearing structure.

13. In an adjustable ratio transmission, a pair of shafts having parallel axes, a driving pulley structure on one shaft, a driven pulley structure on the other shaft, one of said pulley structures having a pair of relatively axially adjustable pulley sections with opposed inclined faces, forming by relative axial adjustment, variable effective pulley diameters, an edge-active belt connecting the pulley structures, means for adjusting the center distance between the shafts, and means for adjusting one pulley section with respect to the other, comprising a thrust bearing structure associated with said one pulley section, a bar movable in a direction parallel to the axis of said pulley structure and supporting said pulley structure, means forming a guide for the bar, and an interlocking connection between the bar and the means for adjusting the center distance.

14. In an adjustable ratio transmission, a pair of shafts having parallel axes, a driving pulley structure on one shaft, a driven pulley structure on the other shaft, one of said pulley structures having a pair of relatively axially adjustable pulley sections with opposed inclined faces, forming by relative axial adjustment, variable effective pulley diameters, an edge-active belt connecting the pulley structures, a standard for one of the shafts, and an adjustable eccentric in said standard, in which eccentric said shaft is mounted.

15. In an adjustable speed drive, a driving shaft and a driven shaft, means for rotatably supporting said driven shaft, a pulley structure in axial driving relation to said driven shaft, an adjustable pulley structure in axial driving relation to said driving shaft, a belt in active power transmitting relation to said pulley structures, said adjustable pulley structure having a pulley section axially fixed to said driving shaft and a pulley section axially adjustable with respect to said driving shaft, said pulley sections having opposed inclined belt engaging faces, forming by relative axial adjustment variable effective pulley diameters, a supporting structure having means for rotatably supporting said driving shaft, means for positively adjusting the position of said supporting structure to adjust the center distance between the axes of said pulley structures, guide means engaging said supporting structure for adjusting the axial position of said driving shaft in response to the adjustment of said center distance and interlocking means for adjusting the axial position of said axially adjustable pulley section in response to the adjustment of said center distance, whereby the members of the adjustable pulley structure are adjusted in the manner required to maintain the belt in substantially perfect alignment for all positions of the adjustable pulley structure.

16. In an adjustable speed drive, an electric motor having a shaft, an adjustable pulley structure in axial driving relation to said shaft, said adjustable pulley structure having a pair of pulley sections having opposed inclined belt engaging faces forming by relative axial adjustment variable effective pulley diameters, a driven shaft, a pulley structure in axial driving relation to said driven shaft, a belt in active power transmitting relation to said pulley structures, an adjustable base for supporting said electric motor, a sub-base having means for supporting said adjustable base, means for adjusting the position of said adjustable base with respect to said sub-base to adjust the center distance between the axes of said pulley structures, and interlocking means for adjusting the axial positions of the pulley sections of said adjustable pulley structure by substantially equal and opposite amounts with respect to said belt in response to the adjustment of said center distance.

17. In an adjustable speed drive, an electric motor having a shaft, an adjustable pulley structure driven by said shaft and rotatably supported thereby, said adjustable pulley structure having a pair of pulley sections with opposed inclined belt engaging faces forming by relative axial adjustment variable effective pulley diameters, a driven shaft, a pulley structure in axial driving relation to said driven shaft, a belt in active driving relation to said pulley structures, an adjustable base for supporting said electric motor, a sub-base having means for supporting said adjustable base, guide means cooperating with said adjustable base and said sub-base for guiding the relative motion thereof, and interlocking means for adjusting said adjustable base to adjust the center distance between the axes of said pulley structures and for adjusting the relative axial position of said pulley sections in accordance with the dimensional requirements of said belt and pulley structures.

18. In an adjustable speed drive, a driving shaft, an adjustable pulley structure in axial driving relation to said driving shaft, said adjustable pulley structure having a pulley section axially fixed with respect to said shaft and a pulley section axially adjustable with respect to said shaft, said pulley sections having opposed inclined belt engaging faces forming by relative axial adjustment variable effective pulley diameters, a driven shaft, a pulley structure in axial driving relation to said driven shaft, a belt in active driving relation to said pulley structures, a supporting structure having means for rotatably supporting said driving shaft, an adjustable base for supporting said supporting structure, a sub-base having means for supporting said adjustable base, guide means cooperating with said adjustable base and said sub-base for guiding the relative motion thereof, and interlocking means, for adjusting said adjustable base to adjust the center distance between the axes of said pulley structures and for adjusting the relative axial position of the pulley sections of said adjustable pulley structure.

19. In an adjustable speed drive, an electric motor having a shaft, an adjustable pulley structure in axial driving relation to said shaft, said adjustable pulley structure having a pulley section axially fixed with respect to said shaft and a pulley section axially adjustable with respect to said shaft, said pulley sections having opposed inclined belt engaging faces forming by relative axial adjustment variable effective pulley diameters, a driven shaft, a pulley structure in axial driving relation to said driven shaft, a belt in active power transmitting relation to said pulley structures, an adjustable base for supporting said electric motor, a supporting base having means for supporting said adjustable base, guide means cooperating with said adjustable base and said supporting base for guiding the relative motion thereof, means for adjusting the position of said adjustable base to adjust the center distance between the axes of said pulley structures and interlocking means for adjusting the axial position of said axially adjustable pulley section in response to the adjustment of said center distance.

20. In an adjustable speed drive in which there are two pulley structures and a belt connecting the structures for transmitting power from one structure to the other structure, said pulley structures being respectively in axial driving relation to a pair of rotatably supported shafts, and in which one of the pulley structures has a pulley section axially fixed with respect to its respective shaft and a pulley section axially adjustable with respect to said shaft, the pulley sections having opposed inclined belt engaging faces forming by relative axial adjustment variable effective diameters, the combination therewith of interlocking means for adjusting the center distance between the axes of said pulley structures and for adjusting the relative axial position of the pulley sections of said adjustable pulley structure, in substantial accordance with the dimensional requirements of said belt and pulley structures, and means for supporting one of said pulley structures for movement in the direction of its axis to maintain the belt in substantial alinement.

21. In an adjustable speed drive in which there are two pulley structures and a belt connecting the structures for transmitting power from one structure to the other structure, said pulley structures being respectively in axial driving relation to a pair of rotatably supported shafts, and in which one of the pulley structures has a pulley section axially fixed with respect to its respective shaft and a pulley section axially adjustable with respect to said shaft, the pulley sections having opposed inclined belt engaging faces forming by relative axial adjustment variable effective diameters, the combination therewith of interlocking means for adjusting the center distance between the axes of said pulley structures and for adjusting the relative axial position of the pulley sections of said adjustable pulley structure, the adjustments provided by said interlocking means being related to the dimensions of said belt and pulley structures in such manner that the belt is maintained in substantial alinement and at a substantially constant tension.

22. In an adjustable speed drive in which there are two pulley structures and a belt connecting the structures for transmitting power from one structure to the other structure, said pulley structure being respectively in axial driving relation to a pair of rotatably supported shafts, and in which one of the pulley structures has a pulley section axially fixed with respect to its respective shaft and a pulley section axially adjustable with respect to said shaft, the pulley sections having opposed inclined belt engaging faces forming by relative axial adjustment variable effective pulley diameters, and in which the center distance between the axes of said pulley structures is variable, the combination therewith of a guide for said adjustable pulley structure, said guide forming an angle with the plane perpendicular to the axes of said pulley structures, and of interlocking means for adjusting the center distance between the axes of said pulley structures and for adjusting the axial position of said axially adjustable pulley section, the adjustments provided by said guide and said interlocking means being related to the dimensions of said belt and pulley structures in the manner required to maintain the belt in substantial alinement.

23. In an adjustable speed drive in which there are two pulley structures and a belt connecting the structures for transmitting power from one structure to the other structure, said pulley structures being respectively in axial driving relation to a pair of rotatably supported shafts, and in which one of the pulley structures has a pulley section axially fixed with respect to its respective shaft and a pulley section axially adjustable with respect to said shaft, the pulley sections having opposed inclined belt engaging faces forming by relative axial adjustment variable effective pulley diameters, and in which the center distance between the axes of said pulley structures is variable, the combination therewith of a guide for said adjustable pulley structure, said guide forming an angle with the plane perpendicular to the axes of said pulley structures, and of interlocking means for adjusting the center distance between the axes of said pulley structures and for adjusting the axial position of said axially adjustable pulley section, the adjustments provided by said guide and said interlocking means being related to the dimensions of said belt and pulley structures in the manner required to maintain the belt at a substantially constant tension.

24. In an adjustable speed drive in which there are two pulley structures and a belt connecting the structures for transmitting power from one structure to the other structure, said pulley structures being respectively in axial driving relation to a pair of rotatably supported shafts, and in which one of the pulley structures has a pulley section axially fixed with respect to its respective shaft and a pulley section axially adjustable with respect to said shaft, the pulley sections having opposed inclined belt engaging faces forming by relative axial adjustment variable effective pulley diameters, and in which the center distance between the axes of said pulley structures is variable, the combination therewith of a guide for one of said pulley structures, said guide forming an angle with the plane perpendicular to the axes of said pulley structures, and of interlocking means for adjusting the center distance between the axes of said pulley structures and for adjusting the axial position of said axially adjustable pulley section, the adjustments provided by said guide and said interlocking means being related to the dimensions of said belt and pulley structures in the manner required to maintain the belt in substantial alinement at a substantially constant tension.

25. In an adjustable speed drive, a driving pulley structure, a driven pulley structure, a belt for transmitting power between said pulley structures, one of said pulley structures having an adjustable effective diameter and including a pair of pulley sections with opposed inclined belt engaging faces, forming by relative axial adjustment variable effective pulley diameters, a shaft in axial driving relation to said adjustable pulley structure, means for securing one of said pulley sections in fixed axial position to said shaft, positive means for adjusting the axial position of the other of said pulley sections, positive means for adjusting the center distance between the axes of said pulley structures, and means for moving one of said pulley structures in an axial direction to maintain said belt in substantial alignment, as the effective diameter of said adjustable pulley structure is varied.

26. In a multiple belt adjustable speed drive a driving shaft, a driven shaft, a pair of multiple belt pulleys in respective axial driving relation to each of said shafts, a plurality of belts in active driving relation to said multiple belt pulleys, one of said multiple belt pulleys having an adjustable effective diameter and including a plurality of coaxial adjustable diameter pulley structures, each of said adjustable pulley structures having a pulley section axially fixed with respect to the supporting shaft, and a pulley section axially adjustable with respect to the supporting shaft, said pulley sections having opposed inclined faces, forming by relative axial adjustment variable effective pulley diameters, means for adjusting the center distance between the axes of said shafts, means for adjusting the axial position of the shaft of said multiple belt adjustable diameter pulley to maintain the belts in alignment and means for adjusting the axial position of the axially adjustable pulley section of each of said adjustable diameter pulley structures.

27. In a multiple belt adjustable speed drive, a driving shaft, a driven shaft, a pair of multiple belt pulleys in respective axial driving relation to each of said shafts, a plurality of belts in active driving relation to said multiple belt pulleys, one of said multiple belt pulleys having an adjustable effective diameter and including a plurality of coaxial adjustable diameter pulley structures, each of said pulley structures having a pulley section axially fixed with respect to its shaft and a pulley section axially adjustable with respect to the fixed pulley section, said pulley sections having opposed inclined faces, forming by relative axial adjustment variable effective pulley diameters, means for adjusting the center distance between the axes of said multiple belt pulleys, means for adjusting the axial position of the shaft of said adjustable multiple belt pulley in response to the adjustment of said center distance, and interlocking means for adjusting the axial position of each of said adjustable pulley sections in accordance with the adjustment of said center distance, whereby the belt engaging each of said adjustable pulley structures is maintained in substantially perfect alignment for all positions of the adjustable pulley structure.

28. In a multiple belt adjustable speed drive an electric motor having a shaft, a multiple belt adjustable diameter pulley in axial driving relation to said shaft, said multiple belt adjustable diameter pulley having a plurality of coaxial adjustable diameter pulley structures, each of said adjustable pulley structures having a pair of pulley sections with opposed inclined belt engaging faces, forming by relative axial adjustment variable effective pulley diameters, a driven shaft, a multiple belt pulley in active driving relation to said driven shaft, a plurality of belts in active power transmitting relation to said multiple belt pulleys, an adjustable base for supporting said electric motor, a supporting base for supporting said adjustable base, means for adjusting the position of said adjustable base with respect to said supporting base to adjust the center distance between the axes of said multiple belt pulleys, and interlocking means for adjusting the axial position of the pulley sections of each of said adjustable pulley structures by substantially equal and opposite amounts with respect to the belt engaging the pulley structure.

29. In a multiple belt adjustable speed drive having a plurality of belts in active driving relation to a pair of multiple belt pulleys, one of said multiple belt pulleys including a plurality of coaxial adjustable diameter pulley structures, each of said pulley structures having a pair of pulley sections with opposed inclined faces, forming by relative axial adjustment variable effective pulley diameters, and the center distance between the axes of said multiple belt pulleys being variable, the combination therewith of means for simultaneously adjusting the center distance between the axes of said pulleys and the effective diameter of each of said adjustable pulley structures, and means for simultaneously adjusting the belt tension of all of said driving belts.

ISAAC E. McELROY.
RICHARD H. SHADRICK.